March 15, 1960 M. M. CUNNINGHAM 2,928,540
TIRE CASING PACKAGE
Filed April 15, 1957
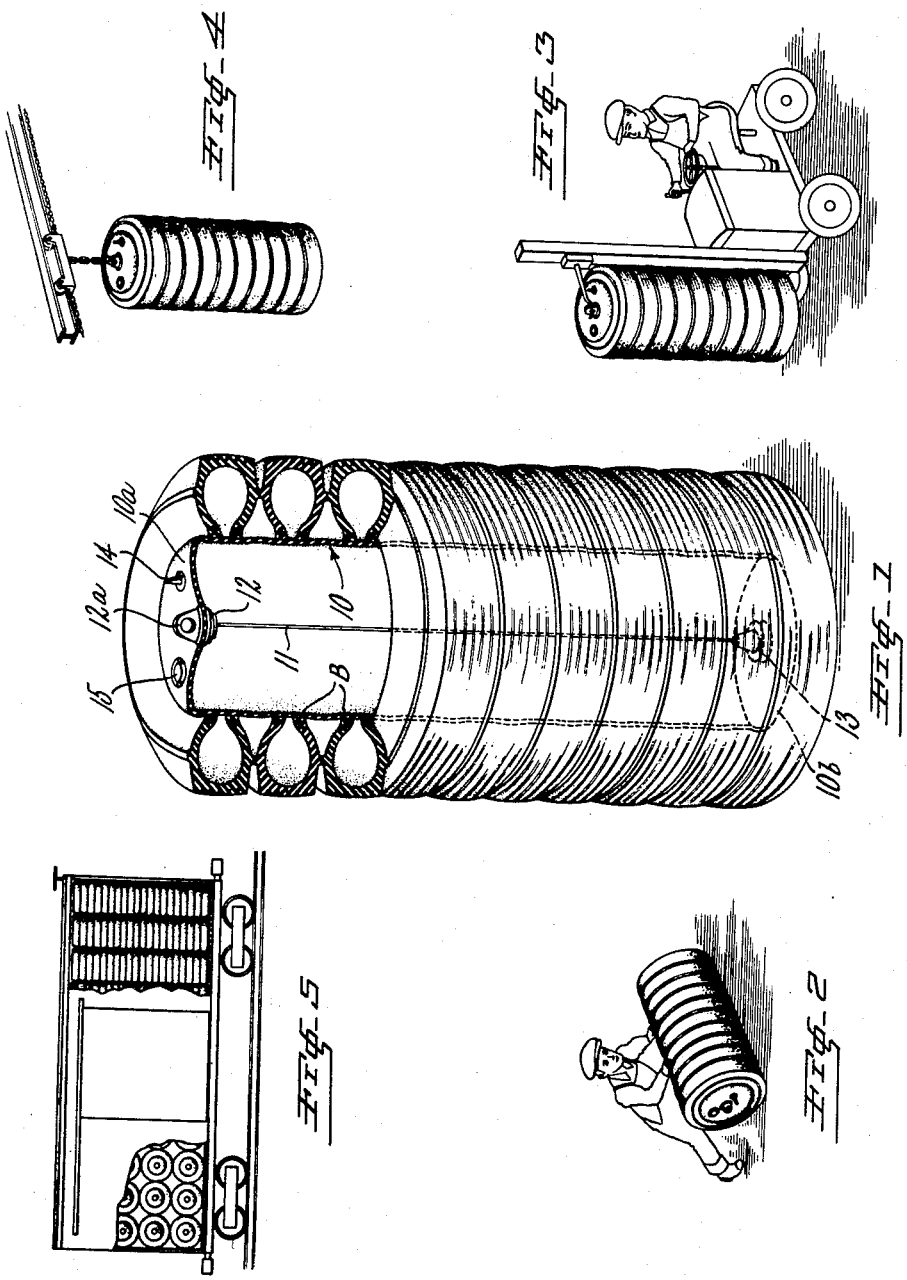
INVENTOR
MARION M. CUNNINGHAM
BY
Irvin M. Lewis
ATTORNEY

United States Patent Office 2,928,540
Patented Mar. 15, 1960

2,928,540

TIRE CASING PACKAGE

Marion M. Cunningham, Providence, R.I., assignor to United States Rubber Company, New York, N.Y., a corporation of New Jersey Application April 15, 1957, Serial No. 652,978

1 Claim. (Cl. 206—65)

This invention relates to the temporary securing together of a plurality of annular articles, such as pneumatic tire casings, to facilitate the handling, transporting and storing of such articles.

The present invention is particularly useful in the handling, transporting and shipping of tubeless tire casings as it permits the beads of such tire casings to be held in spaced apart relationship without the use of bead spacers such as those shown in U.S. Patent No. 2,573,664. As explained in this patent, holding of the bead of tubeless tire casings in spaced apart relationship during handling, transporting and storing is desirable as it facilitates making the initial seal between the tire bead and the rim in mounting of the tire on the rim preparatory to inflating the tire.

The present invention utilizes an inflatable and collapsible bag having a generally cylindrical shape when inflated and having substantially inextensible means internally thereof secured to and extending between end portions of the bag to limit axial extension of the bag. The bag is inflatable to a diameter slightly larger than the opening through the annular articles.

In accordance with the invention, the annular articles, such as tubeless tire casings, are stacked with their openings in approximate alignment. The inflatable bag while in a collapsed or partially collapsed condition is inserted through the openings of the stacked tire casings until the end of the bag rests on the same base as the stacked tires. The bag is then inflated so that it expands and tightly grips the inner surfaces of the beads of the tire casings thereby securing the tire casings together so they may be handled as a unit and holding the beads of the individual tire casings in spaced apart relationship, thereby preventing the beads of the tire casings from being forced together and the side sealing surfaces of the beads from being damaged. To remove the tire casings the bag is merely deflated.

Other objects and advantages of the present invention will become apparent from the following description when read in conjunction with the accompanying drawing wherein:

Fig. 1 is a perspective view, partly in section, showing a plurality of tubeless tire casings secured together in accordance with the present invention so that they can be easily handled, transported or stored as a unit;

Figs. 2, 3, 4 and 5, illustrate various ways the unit shown in Fig. 1 may be handled or transported;

Fig. 2 illustrates manual rolling of the unit;

Fig. 3 illustrates lifting and transporting of the unit by a lift truck;

Fig. 4 illustrates lifting and transporting of the unit by a traveling hoist; and Fig. 5 illustrates shipping of a plurality of units in a box car, the units being shown stacked end on end and on their sides.

Referring to the drawing, and in particular to Fig. 1, the bag, generally designated by the reference numeral 10, is formed of suitable, flexible gas imperivous material and is of generally cylindrical shape when inflated. The bag 10 may be conveniently formed of rubberized cord fabric as described in my U.S. Patent No. 2,612,924. A substantially inextensible member 11 extends internally of the bag 10 and is secured at each end to the center of the end or head portions 10a and 10b of the bag 10 by suitable fittings 12 and 13. Fitting 12 is preferably provided with a lifting eye 12a. The member 11 may conveniently consist of a steel cable as also described in my U.S. Patent No. 2,612,924.

The bag 10 has a diameter when inflated slightly larger than the inner bead diameters of the tire casings, and is conveniently inflated by means of a conventional inner tube valve stem assembly 14 secured to the end or head 10a. For quick deflation, a screw plug 15, also provided in the end 10a, may be removed.

The tire casings may be stacked in only approximate alignment as inflation of the bag 10 after insertion of the bag 10 through their openings will align the tires. As shown in Fig. 1, the bag 10 when inflated tightly grips the inner surfaces of the beads B of the stacked tire casings securing the tire casings together so that they can be easily handled, transported, or stored as a unit. When the beads B of the tire casings are so gripped, the beads of individual and adjacent tire casings are held in spaced relationship so that they are not forced together in subsequent handling, transporting or storing. The wall of the bag 10 seals the interiors of the tire casings preventing entry of water or other foreign material into the interior of the casings. The outer side surfaces of the beads of the tire casings are protected against damage from adjacent tires by being held in spaced relationship from the beads of adjacent tire casings. The side surfaces of the beads of the end tires are protected from damage by the projecting ends 10a and 10b of the inflated bag 10. From the above description there can be seen that there is provided an inexpensive, efficient and effective method of securing together a plurality of annular articles, so that the articles may be easily handled, transported or stored as a unit. The invention is particularly useful in the handling, storing and transporting of tubeless tire casngs as the beads of the tires are held in spaced relationship and the important outer side surfaces of the beads which form the seal with the rim flanges of the wheel are effectively protected.

Having thus described my invention, what I claim and desire to protect by Letters Patent is:

A package comprising a plurality of pneumatic tire casings of the type having spaced beads, and an inflated generally cylindrical flexible bag within the inner circumference of said tire casings, gripping the inner surfaces of the beads of said tire casings and holding said casings together in sidewall contact.

References Cited in the file of this patent

UNITED STATES PATENTS

| | | |
|---|---|---|
| 1,107,339 | Milliron | Aug. 18, 1914 |
| 1,354,371 | Angier | Sept. 28, 1920 |
| 1,387,549 | Lungren | Aug. 16, 1921 |
| 1,457,496 | Butler | June 5, 1923 |
| 1,476,319 | Angier | Dec. 4, 1923 |
| 2,193,481 | Fawick | Mar. 12, 1940 |
| 2,672,902 | Proger | Mar. 23, 1954 |